US005296299A

United States Patent [19]

Makishima et al.

[11] Patent Number: 5,296,299

[45] Date of Patent: Mar. 22, 1994

[54] THERMAL TRANSFER FILM

[75] Inventors: Hideo Makishima, Tokyo; Sadao Morishita, Ushiku; Toshihiko Matsushita, Tokyo, all of Japan

[73] Assignee: Matsubishi Paper Mills Ltd., Tokyo, Japan

[21] Appl. No.: 978,973

[22] Filed: Nov. 23, 1992

Related U.S. Application Data

[63] Continuation of Ser. No. 340,457, Apr. 19, 1989, abandoned.

[30] Foreign Application Priority Data

| | | | |
|---|---|---|---|
| Apr. 23, 1988 | [JP] | Japan | 63-100678 |
| Aug. 25, 1988 | [JP] | Japan | 63-211937 |
| Nov. 29, 1988 | [JP] | Japan | 63-302779 |
| Jan. 6, 1989 | [JP] | Japan | 1-1589 |

[51] Int. Cl.$^5$ .................. B32B 9/00

[52] U.S. Cl. .................. 428/447; 428/195; 428/484; 428/488.1; 428/913; 428/914

[58] Field of Search .................. 428/195, 447, 484, 488.1, 428/488.4, 913, 914

[56] References Cited

FOREIGN PATENT DOCUMENTS 0222240 5/1987 European Pat. Off. .

*Primary Examiner*—Patrick J. Ryan
*Assistant Examiner*—William A. Krynski
*Attorney, Agent, or Firm*—Cushman, Darby & Cushman

[57] ABSTRACT

The present invention provides a thermal transfer film which is prevented from static charging phenomenon, sticking phenomenon and staining of thermal head. This transfer film comprises a base film and an antistatic layer comprising an inorganic polymer of polysiloxane containing silanol group or a quaternary ammonium type polyelectrolyte which is provided on at least one side of the base film. A heat meltable ink layer is provided on one side of the base film.

11 Claims, 2 Drawing Sheets

THERMAL TRANSFER FILM

This application is a continuation of our application Ser. No. 07/340,457 filed Apr. 19, 1989, now abandoned.

BACKGROUND OF THE INVENTION

1. Field of the Invention

This is a continuation of U.S. application Ser. No. 07/340,457 filed Apr. 19, 1989 now abandoned.

The present invention relates to a thermal transfer film used in thermal recording devices such as thermal printer, etc. and more particularly to a thermal transfer film which can prevent static charging phenomenon on recording, sticking phenomenon and staining of a thermal head.

2. Discussion on Related Arts

Recently, thermal transfer films comprising a base film coated with a heat-meltable ink have come to be used rapidly in thermal recording devices such as thermal printers and thermal facsimiles. Thus clear images are obtained on plain papers. That is, a plain paper and a heat-meltable ink layer of a thermal transfer film are brought into close contact with each other and are subjected to localized heating by a pulse signal from a thermal head opposite to the heat-meltable ink layer.

The heated heat-meltable ink layer is molten and transferred to the plain paper to give an image.

As a base film of such thermal transfer films, there have been known various films such as polyester, polycarbonate, polystyrene, polyethylene, polypropylene, vinyl chloride, vinylidene chloride, polyimide and polyamide.

In many cases, a heat resistant layer of a silicone resin and the like is provided on the surface which contacts with a thermal head to prevent sticking.

However, thermal transfer films with the above-exemplified base films are high in surface resistivity whose surface contacts with a thermal head, namely, at least $10^{14}$ and hence have the defect that static electricity is often generated at thermal transfer printing.

Static electricity is generated due to friction between the thermal head and the thermal transfer film on thermal transfer printing and when the thermal transfer film is peeled from a plain paper.

Obstruction caused by occurrence of static electricity is an electric shock given to human body at the time of changing of used thermal transfer film roll charged with 10 KV or higher. Besides, dust collected on thermal head sometimes result in unclear images. Further, the plain paper is also charged to deteriorate travelling property of the paper in some cases.

Hitherto, various proposals have made to improve this static charging phenomenon. For example, Japanese Patent Kokai (Laid-Open) No. 129789/82 has proposed a method of providing a resin layer containing a surface active agent or an organic salt on the surface of a base film opposite to the ink layer. However, the surface active agent and the organic salt are still insufficient in antistatic effect (the effect of preventing static charging phenomenon) because these are contained in a resin layer. That is, in order that a surface active agent exhibits the effect as antistatic agent, the surface active agent needs to be migrated to the surface of a resin layer and is present on the surface in such a state that oleophilic portion of the molecule of the surface active agent faces inner portion of the resin and hydrophilic portion faces air and thus water in air is adsorbed to the hydrophilic portion to exhibit the antistatic effect. If compatibility between the resin and the surface active agent is high, less migration to the surface of the resin occurs and the effect is difficult to be exhibited.

On the other hand, if the compatibility is poor, the surface active agent moves to the surface of resin to exhibit antistatic effect, but there is the defect of the surface active agent, that is staining a thermal head.

Japanese Patent Kokai (Laid-Open) No. 151095/85 proposes thermal transfer films containing an electrically conductive material and discloses that this has antistatic effect. Specifically, this patent publication proposes a thermal transfer film where a conductive material is provided as a layer on a support opposite to a heat meltable ink layer, a thermal transfer film where the conductive material is provided as a layer between the support and the heat meltable ink layer, a thermal transfer film where the conductive material is contained in the heat meltable ink layer and a thermal transfer film where the conductive layer is contained in a heat resisting layer. As the electrically conductive material, there are mentioned NaCl, KCl, $MgCl_2$, anionic surface active agents, cationic surface active agents, nonionic surface active agents ampholitic surfactant, Al, Cu, Zn, carbon, polyelectrolytes, organic semiconductors and the like. In order to provide these conductive materials in the form of a layer, they must be contained in resins and those which contain NaCl, KCl, $MgCl_2$, or surface active agents are still insufficient in antistatic effect.

Furthermore, resins containing Al, Cu, Zn or carbon have antistatic effect, but base film of thermal trahsfer film becomes opaque and weight of coated heat meltable ink cannot be controlled by transmission density. Thus, there remain practical problems.

SUMMARY OF THE INVENTION

The object of the present invention is to provide a thermal transfer film which is improved in the above problems and free from static charging phenomenon on thermal transfer recording.

The above object has been attained by providing on at least one side of a base film an inorganic polymer layer comprising a polysiloxane containing silanol group or a layer comprising a quaternary ammonium salt type polyelectrolyte.

The thermal transfer film is high in antistatic effect on printing and as a result causes no stain of thermal head.

BRIEF DESCRIPTION OF THE DRAWINGS

FIG. 1 shows a thermal transfer film which comprises a base film provided with an antistatic layer on one side and a heat meltable ink layer on the other side.

FIG. 2 shows a thermal transfer film which comprises a base film provided with antistatic layers on both sides and further provided with a heat resisting layer on the antistatic layer of one side and a heat meltable ink layer on the antistatic layer of the other side.

FIG. 3 shows a thermal transfer film which comprises a base film provided with a heat resisting layer on one side, and antistatic layer and a heat meltable ink layer in succession on the other side.

FIG. 4 shows a thermal transfer film which comprises a base film provided with a heat resisting layer containing an antistatic agent on one side and an antistatic layer and a heat meltable ink layer in succession on the other side.

FIG. 5 shows a thermal transfer film which comprises a base film provided with an antistatic layer and a heat resisting layer in succession on one side, and a heat meltable ink layer on another side.

FIG. 6 shows a thermal transfer film which is a variation of the thermal transfer film shown in FIG. 3, namely, an antistatic layer is provided between the base film and the heat resisting layer.

FIG. 7 shows a thermal transfer film which is a variation of the thermal transfer film of FIG. 4, namely, the antistatic layer provided between the base film and the heat meltable ink layer in FIG. 4 is omitted.

In FIGS. 1–8, the following figures denote the layers as specified below:

1 . . . Base film, 2 . . . Antistatic film, 3 . . . Heat meltable ink layer, 4 . . . Heat resisting layer, 4' . . . Heat resisting layer (containing antistatic agent).

DETAILED DESCRIPTION OF PREFERRED EMBODIMENTS

The thermal transfer film of the present invention comprises a base film, a heat meltable ink layer, a heat resisting layer and an antistatic layer and the antistatic layer comprises an inorganic polymer of a polysiloxane containing a silanol group or a quaternary ammonium salt type polyelectrolyte.

The heat resisting layer and the antistatic layer may be integrally formed.

The present invention includes the following embodiments depending on position of antistatic layer coated and coating method thereof.

The first embodiment comprises a base film with an antistatic layer provided on one side and a heat meltable ink layer provided on the other side.

The second embodiment comprises a base film with antistatic layers provided on both sides and further a heat meltable ink layer provided on one of the antistatic layers and a heat resisting layer provided on the other side of the antistatic layer.

The third embodiment comprises a base film with a heat resisting layer provided on one side as well as an antistatic layer and a heat meltable ink layer laminated in succession on the other side.

The fourth embodiment comprises a base film with a heat resisting layer containing an antistatic agent provided on one side as well as an antistatic layer and a heat meltable ink layer laminated in succession on the other side.

The fifth embodiment comprises a base film with an antistatic layer and a heat resisting layer laminated in succession on one side and a heat meltable ink layer on the other side.

The sixth embodiment which is a variation of the fourth embodiment comprises a base film with a heat meltable ink layer on one side and an antistatic layer and, provided thereon, a heat resisting layer on another side.

The seventh embodiment which is a variation of the fifth embodiment comprises a base film with a heat meltable layer on one side and a heat resisting layer containing an antistatic agent on another side.

That is, as mentioned above, the base film for the thermal transfer of the present invention can be obtained by providing an antistatic layer containing an inorganic polymer of a polysiloxane containing silanol or a quaternary ammonium type polyelectrolyte as antistatic agent on the said film.

Figure 6:
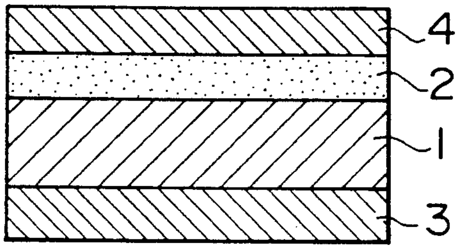
Figure 7:
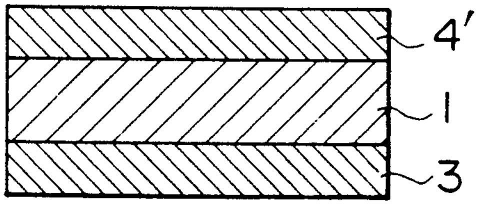
Figure 8:
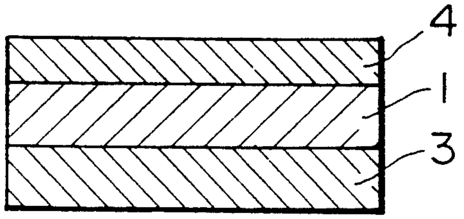
FIG. 8 illustrates a conventional thermal transfer film which comprises a base film provided with a heat meltable ink layer on one side and a heat resisting layer on the other side.

FIGS. 1–7 show cross-sections of the thermal transfer films of the present invention and FIG. 8 shows a conventional thermal transfer film.

Figure 1:
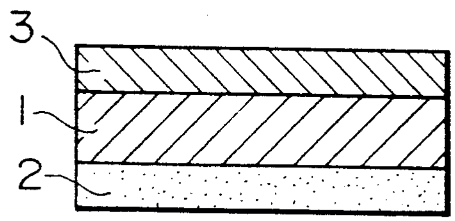
FIGS. 1-7 illustrate construction of the thermal transfer film of the present invention.

In the example of FIG. 1, antistatic layer 2 is provided on one side of base film 1 and heat meltable ink layer 3 is provided on the other side.

Figure 2:
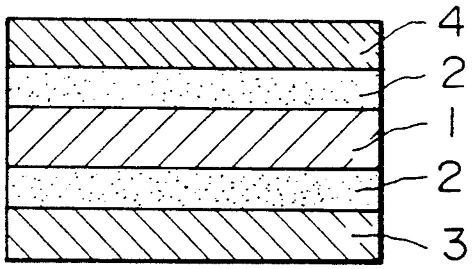

In the example of FIG. 2, antistatic layers 2 are provided on both sides of base film 1, heat resisting layer 4 is laminated on the antistatic layer 2 on one side and heat meltable ink layer 3 is laminated on the antistatic layer 2 on the other side.

Figure 3:
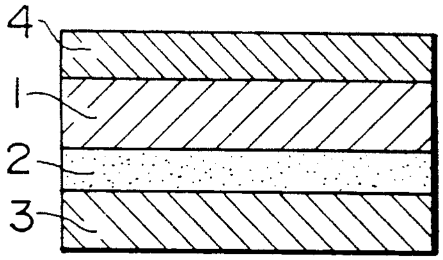

In the example of FIG. 3, heat resisting layer 4 is provided on one side of base film 1 and antistatic layer 2 and heat meltable ink layer 3 are laminated in succession on the other side of base film 1.

Figure 4:
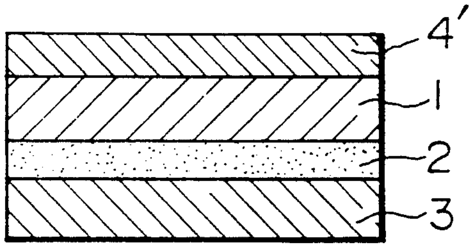

In the example of FIG. 4, heat resisting layer 4' containing an antistatic agent is provided on one side of base film 1 and antistatic layer 2 and heat meltable ink layer 3 are laminated in succession on the other side.

Figure 5:
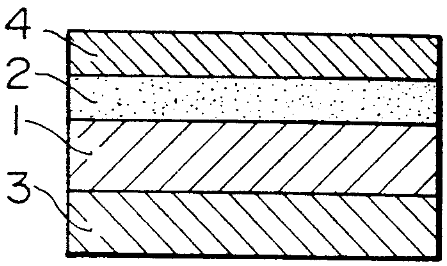

In the example of FIG. 5, antistatic layer 2 is provided on one side of base film 1 and heat resisting layer 4 is laminated on the antistatic layer 2 and heat meltable ink layer 3 is provided on the other side.

In the example of FIG. 6, heat meltable ink layer 3 is provided on one side of base film 1 and antistatic layer 2 and, provided thereon, heat resisting layer 4 are provided on the other side.

In the example of FIG. 7, heat meltable ink layer 3 is provided on one side of base film 1 and heat resisting layer 4' containing an antistatic agent is provided on the other side.

FIG. 8 illustrates a conventional thermal transfer film, in which heat meltable ink layer 3 is provided on base film 1 and heat resisting layer 4 is provided on the other side.

As shown in the above-mentioned constructive examples, the construction of the present invention have the following construction.

(1) An antistatic layer is provided on one or both sides of a base film.

(2) A heat meltable ink layer or a heat resisting layer is laminated on the antistatic layer.

(3) The heat resisting layer and the antistatic layer may be integrally provided.

In the case of using an inorganic polymer of a polysiloxane containing a silanol group for antistatic layer, the layer also possesses sticking resistance, but has difficulty in blocking resistance because it is somewhat hard and brittle as a cured film in connection with adhesion to the base film. For improving this problem, a method of overcoating the antistatic layer with a heat resisting layer or a method of containing an antistatic agent in the heat resisting layer can be expected to exhibit unexpectable effect in adhesion to base film.

That is, in case a heat resisting layer is provided on the antistatic layer, a heat resisting material having also adhesiveness to a base film firmly adheres to a base film and hence the antistatic layer on the base film is in such a state that it is overcoated with the heat resisting layer and thus antistatic effect can be maintained.

In case an antistatic agent is contained in the heat resisting layer, the layer can more firmly adhere to the base film.

Furthermore, by providing the antistatic layer on the side of the base film on which the heat meltable ink layer is provided, the higher antistatic effect can be obtained. The reason is considered to be as follows:

On thermal transfer recording, the thermal transfer film is peeled from an image receiving sheet. Static electricity is generated at the time of the peeling. The generated static electricity is removed from the contacting portion such as a thermal head. In this case, if electrostatic capacity is high, thermal head might be ruptured.

That is, more preferable film can be obtained by providing the antistatic layer in the vicinity of the source of generation of static electricity.

Further preferred effect can be obtained if an antistatic layer is provided also on the side of base film on which heat resisting layer is present, as an independent layer or in the form of being integral with the heat resisting layer.

The inorganic polymer of polysiloxane containing silanol group which is one of the antistatic agents used in the present invention comprises a colloid dispersion of silica having a particle size of 1-20 mμ, preferably 5-8 mμ, that is, a silica sol.

Such colloid dispersion of silica is prepared by a process through which silicon tetrachloride is reacted with water in a monovalent alcohol or an alkyl acetate to obtain a partial hydrolyzate.

Suitable monovalent alcohols are methyl alcohol, ethyl alcohol, butyl alcohol and isopropyl alcohol. Suitable alkyl acetates are methyl acetate, ethyl acetate and butyl acetate.

When such colloid dispersion of silica is used as a coating liquid, acids such as hydrochloric acid, sulfuric acid and phosphoric acid are used as curing catalysts and pH of the coating liquid is preferably 2-5.

If pH is less than 2, coating machine is apt to be corroded. If pH is more than 5, curing requires much time.

When it is necessary to adjust the concentration of coating liquid of colloid dispersion of silica, it is preferred to dilute it with a monovalent alcohol considering stability and drying properties. That is, an alcoholic silica sol is preferred.

This coating liquid of colloid dispersion of silica is coated on a base film by a gravure coater or the like and then dried.

Coating component is cured with volatilization of solvent to produce a transparent film. This cured film is an antistatic layer comprising an inorganic polymer of a polysiloxane having a silanol group.

The inorganic polymer of polysiloxane having a silanol group used in the present invention as an antistatic agent forms a cured film upon being coated on a base film and this is an inorganic polymer of polysiloxane which has the characteristics that it easily releases heat meltable ink from base film on thermal transfer recording with maintaining adhesiveness to the base film. This means superiority in transferability, namely, printability. This is considered due to non-adhesiveness of inorganic polymer of polysiloxane.

The inorganic polymer having silanol group of the present invention is greatly different from polyorganosiloxanes in antistatic effect. Polyorganosiloxanes such as silicone resins, silicone rubbers and alkoxysilane cured products are organic polymers which have a high surface resistivity of film of $10^{14}$ Ω or higher and have no antistatic effect. Silicone oil, for example, polyether modified silicone oil is sometimes used as antistatic agent, but this prevents static charging by reducing friction and does not have so much antistatic effect. Besides, being liquid, this causes problems such as blocking.

As mentioned above, the coating liquid of colloid dispersion of silica is preferably an alcoholic silica sol containing a monovalent alcohol.

Aqueous silica sol is prepared by a process of adding an acid to sodium silicate to produce a silicate sol and separating it into an electrolyte and a sol by dialysis or a process using an acid and H+ type cation exchange resin. Therefore, the resulting sol is high in sodium content and thus film of aqueous silica sol tends to corrode thermal head. Therefore, the sodium must be removed and besides, the aqueous silica sol is inferior in drying property because it is aqueous.

The quaternary ammonium type polyelectrolyte which is another antistatic agent used in the present invention is an acrylic cationic polymer and preferably comprises monomers having two quaternary ammonium ions and one hydroxyl group.

This quaternary ammonium type polyelectrolyte is a polymer or copolymer obtained by polymerizing a monomer of the following formula (1) or, if necessary, copolymerizing with a monomer copolymerizable with the monomer of the formula (1) and then reacting the resulting polymer or copolymer with a quaternary ammonium salt of the formula (2) and this polyelectrolyte is represented by the formula (3).

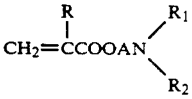

(1)

wherein R represents a hydrogen atom or a methyl group, $R_1$ and $R_2$ each represents a methyl group or an ethyl group and A represents an alkylene group which may have substituent.

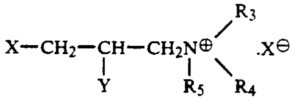

(2)

wherein $R_3$ and $R_4$ each represents a methyl group, an ethyl group, $(CH_2CH_2O)_mH$ (m denotes an integer of 1-4) or a benzyl group, $R_5$ represents an alkyl group of 1-18 carbon atoms, an alkenyl group or $(CH_2CH_2O)_nH$ (wherein n represents an integer of 1-4), X represents a halogen atom and Y represents a hydroxyl group (X and Y together may form a linkage through an oxygen atom).

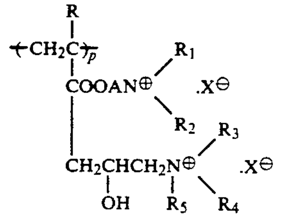

(3)

wherein R, $R_1$, $R_2$, $R_3$, $R_4$, $R_5$, X and A are as defined above and p represents an integer of $10^1$–$10^4$.

As monomers represented by the formula (1), mention may be made of, for example, N,N-dimethylaminoethyl methacrylate, N,N-diethylaminoethyl methacrylate, N,N-dimethylaminoethyl acrylate, N,N-diethylaminoethyl acrylate, N,N-dimethylaminopropyl methacrylate, and N,N-dimethylaminobutyl methacrylate.

As monomers which may be copolymerized with those of the formula (1), mention may be made of, for example, methyl, ethyl, 2-ethylhexyl, lauryl, myristyl, and stearyl (meth)acrylates, styrene, acrylonitrile, vinyl acetate, β-hydroxyethyl (meth)acrylate, ethylene glycol di(meth)acrylate, acrylamide, diacetoneacrylamide, ethylene, propylene and divinylbenzene.

As quaternary ammonium salts represented by the formula (2), mention may be made of, for example, glycidyltrimethylammonium chloride, 3-chloro-2-hydroxypropyltrimethylammonium chloride, 3-chloro-2-hydroxypropyltriethanolammonium chloride, glycidyltrimethylammonium chloride, glycidyldimethylbenzylammonium chloride, and glycidyldimethylbutylammonium chloride.

These can be reacted by conventional processes.

The quaternary ammonium type polyelectrolytes per se are high in antistatic properties and can provide a surface resistivity of $10^6$ Ω or less when thickness of the coat is 1 μm. Thus, they are absolutely excellent. Besides, these polyelectrolytes have a high molecular weight and excellent in film-formability and so can be made into a thin film. Furthermore, blocking is not brought about and antistatic performance can be fully maintained.

Adhesion to the base film is markedly high because the polyelectrolyte is an acrylic cationic (co)polymer to give preferred characteristics to thermal transfer film. That is, peeling off of heat meltable ink does not occur.

Next, explanation will be made on coating of antistatic layer.

In case of the antistatic layer made of inorganic polymer of polysiloxane containing silanol group, surface resistivity is in the order of about $10^9$ Ω at a thickness of about 0.1 μm. In order to obtain antistatic effect, the varied film is provided of suitable thickness so that surface resistivity can be $9.9\times10^{10}$ Ω or lower, preferably $5\times10^{10}$ Ω or lower. When thickness of the antistatic layer comprising inorganic polymer of polysiloxane containing silanol group is more than 0.5 μm, cracks tend to occur in the film and thus a thickness of 0.5 μm or less is preferred. The thickness is more preferably 0.1–0.3 μm. With reference to the lower limit of film thickness, the thickness is controlled so that surface resistivity does not exceed $9.9\times10^{10}$ Ω. The lower limit of the thickness is 0.1 μm and this is controlled by surface resistivity because it cannot be measured by micrometer.

In case a heat resisting layer is coated on the coated antistatic layer, thickness of the heat resisting layer is preferably 1.0 μm or less, more preferably 0.3–0.6 μm. If thickness is less than 0.2 μm, the film is inferior in sticking resistance and if 1.0 μm or higher, antistatic effect of antistatic layer on the base film is insufficient.

Thickness of heat resisting layer containing antistatic agent is preferably 0.3–1.5 μm, more preferably 0.4–1.0 μm.

In this case, mixing ratio of the antistatic agent and the heat resisting material is preferably 0.25–10.0 parts by weight, more preferably 1.0–5.0 parts by weight of the heat resisting material per 1 part by weight of the antistatic agent.

In case of antistatic layer comprising a quaternary ammonium type polyelectrolyte, surface resistivity is in the order of about $10^8$ Ω with a thickness of about 0.1 μm. In order to exhibit antistatic effect, this layer can be provided of the suitably varied thickness so that surface resistivity is not more than $9.9\times10^{10}$ Ω. Thickness of this layer is preferably 0.1–0.5 μm, more preferably 0.1–0.3 μm as in the case of inorganic polymer of polysiloxane. For the lower limit of the film thickness, surface resistivity is controlled so as not to exceed $9.9\times10^{10}$ Ω.

The lower limit of thickness is 0.1 μm which is controlled by surface resistivity since it cannot be measured by micrometer. Upper limit of thickness is 0.5 μm and when thickness is more than the upper limit, laminated heat resisting layer or heat meltable ink layer tends to peel off from base film and this is not desired.

The heat resisting materials used for heat resisting layer of the thermal transfer film of the present invention can be known materials such as, for example, silicone resins, epoxy resins, melamine resins, phenol resins, fluororesins, polyimide resins and nitrocellulose.

Thickness of the heat resisting layer is preferably less than 1.0 μm, more preferably 0.3–0.6 μm. If thickness is less than 0.2 μm, its sticking resistance is inferior and if it is 1.0 μm or more, antistatic effect of antistatic layer on base film is insufficient.

The base film used in the present invention is not specially limited and can be conventionally used ones such as, for example, polyester film, polycarbonate film, polypropylene film, polyimide film and acetate film. Thickness of the base film is 3–16 μm, preferably 4–7 μm.

The heat meltable ink layer of the thermal transfer film of the present invention comprises a coloring agent, a wax and a resin.

The coloring agents include, for example, Benzidine Yellow G as yellow coloring agent, Rhodamine Lake Y as magenta coloring agent, Phthalocyanine Blue as cyan coloring agent and carbon black as black coloring agent.

The waxes include, for example, paraffin wax, carnauba wax, microcrystalline wax, low molecular weight polyethylene wax, oxidized polyethylene wax and synthetic wax.

The resins include, for example, ethylenevinyl acetate copolymer, ethylene-ethyl acrylate copolymer, fatty acid hydrocarbon resins, and aromatic hydrocarbon resins.

Other additives such as pigment dispersant, oil and the like may be added as required.

Methods for coating the antistatic layer of the thermal transfer film, the heat resisting layer and the heat resisting layer containing antistatic agent include known methods using coaters such as roll coater or bar coater, and known methods using printing machines such as gravure method and flexographic method. These can be employed depending on the objects.

The thermal transfer film of the present invention will be explained by the following examples and comparative examples.

EXAMPLE 1

A coating liquid of 2% alcoholic silica sol containing isopropyl alcohol and 1-butanol as dispersing media and having a pH of 4.2 was coated on one side of a polyester film of 6μ thick by a gravure coater and was dried to form a layer of inorganic polymer of polysiloxane containing silanol group having a thickness of 0.1 μm.

On the other side of the polyester film was coated a heat meltable ink having the following composition at a coverage of 3 g/$m^2$ by a roll coater to give a thermal transfer film of the present invention. (Composition of heat meltable ink)

| (Composition of heat meltable ink) | |
|---|---|
| Carbon black | 15 parts by weight |
| Black dye | 5 parts by weight |
| Paraffin wax | 40 parts by weight |
| Carnauba wax | 30 parts by weight |
| Ethylene vinyl acetate resin | 10 parts by weight |

COMPARATIVE EXAMPLE 1

A coating composition composed of 10 parts by weight of 50% xylene solution of silicone resin and 1 part by weight of a metal salt of an organic acid (curing agent) was coated on one side of a polyester film of 6μ thick by a gravure coater and was dried to form a coat of 0.5 g/$m^2$. On the other side of the polyester film was coated a heat meltable ink in the same manner as in Example 1 to give a thermal transfer film which was outside the scope of the present invention.

COMPARATIVE EXAMPLE 2

A coating composition composed of 10 parts by weight of 50% xylene solution of silicone resin and 1 part by weight of a metal salt of an organic acid (curing agent) was coated on one side of a polyester film of 6μ thick by a gravure coater and was dried to give a coat of 0.5 g/$m^2$. On this coat was further coated a quaternary ammonium salt (Staticide ® manufactured by Analytical Chemical Laboratories) which was a surface active agent for antistatic purpose by a spray at a coverage of 0.1 g/$m^2$.

On the other side of the polyester film was coated the heat meltable ink in the same manner as in Example 1 to make a thermal transfer film which was outside the scope of the present invention.

COMPARATIVE EXAMPLE 3

A thermal transfer film outside the scope of the present invention was produced in the same manner as in Comparative Example 1 except that the heat meltable ink had the following composition.

| (Composition of heat meltable ink) | |
|---|---|
| Carbon black | 10 parts by weight |
| Black dye | 5 parts by weight |
| Paraffin wax | 40 parts by weight |
| Carnauba wax | 30 parts by weight |
| Ethylene vinyl acetate resin | 10 parts by weight |
| Acetylene black (electroconductive material) | 5 parts by weight |

Performances of the thermal transfer films obtained in the above Example and Comparative Examples 1 to 3 were evaluated by recording using a thermal printing apparatus manufactured by Matsushita Electronic Components Co., Ltd. and the results are shown in the following Table 1.

TABLE 1

| | Evaluation | | | |
|---|---|---|---|---|
| | Static charging (kV) | Surface resistivity (Ω) | Sticking resistance | Resistance to staining of thermal head |
| Example 1 | 0.1 (∘) | 4.9 × $10^9$ (∘) | ∘ | ∘ |
| Comparative Example 1 | 10 or more (x) | $10^{14}$ or more (x) | ∘ | ∘ |
| Comparative Example 2 | 1~2 (Δ) | 9.4 × $10^{12}$ (Δ) | ∘ | x |
| Comparative Example 3 | 10 or more (x) | $10^{14}$ or more (x) | ∘ | ∘ |

Criteria for evaluation:
∘: Good,
Δ: Somewhat good,
x: Bad

Recording conditions: Recording was carried out by a thermal printing device manufactured by Matsushita Electronic Components Co., Ltd. Plain paper (TTR-T) manufactured by Mitsubishi Paper Mills Ltd. was used as an image receiving sheet.

Voltage: 16 V

Pulse width: 1.4 m sec.

Static chargeability: Static electricity generated was measured by Simuco Static Electricity Measuring Device FM200 when recording was carried out under the above conditions and thermal transfer film and image receiving sheet were separated from each other.

Surface resistivity: This was measured by surface resistivity meter manufactured by Yokokawa Hewlett Packard Co. (at 20° C., 65% RH).

Sticking resistance: This was checked by sticking noise.

Resistance to staining of thermal head: Stain which occurred on thermal head was visually evaluated.

The thermal transfer film of Example 1 had a low surface resistivity of 4.9×$10^9$ Ω at the portion which contacts with thermal head and hence, static charge at thermal transfer recording was low, namely, 0.1 KV and thus static charging phenomenon was prevented. Besides, sticking resistance was superior and stain of thermal head was little.

The thermal transfer film of Comparative Example 1 had a high surface resistivity of $10^{14}$ Ω or higher at the portion which contacts with thermal head and hence, static charging at thermal transfer recording was high, namely, 10 KV or higher.

The thermal transfer film of Comparative Example 2 was somewhat low in surface resistivity at the portion which contacts with thermal head, namely, 9.4×$10^{12}$ Ω, but this was still insufficient. Therefore, static charging at thermal transfer recording was low, namely, 1-2 KV, but static charging phenomenon was observed. Furthermore, stain of thermal head was observed.

The thermal transfer film of Comparative Example 3 was also inferior like that of Comparative Example 1.

EXAMPLE 2

A coating liquid of 2% alcoholic silica sol of pH 4.2 and containing isopropyl alcohol and 1-butanol as dispersing media was coated on both sides of a polyester film of 6 μm thick by a gravure coater and dried to obtain antistatic layers comprising inorganic polymer of polysiloxane having silanol group and having a thickness of 0.1 μm.

Successively, a coating liquid of heat resisting material comprising 10 parts by weight of 50% xylene solution of silicone resin and 1 part by weight of a metal salt of organic acid (curing agent) was coated on one of the antistatic layers by a gravure coater to form a coat of heat resisting layer having a thickness of 0.5 μm.

A heat meltable ink having the following composition was coated on the other antistatic layer by a hot melt coater at a coverage of 3 $g/m^2$ to obtain a thermal transfer film of the present invention.

| (Composition of heat meltable ink) | |
|---|---|
| Carbon black | 15 parts by weight |
| Black dye | 5 parts by weight |
| Paraffin wax | 40 parts by weight |
| Carnauba wax | 30 parts by weight |
| Ethylene-vinyl acetate resin | 10 parts by weight |

Performances of the resulting thermal transfer film was evaluated in the same manner as in Example 1. Recording quality was evaluated by measuring optical density of image transferred on an image receiving sheet under the above recording conditions by a densitometer; Macbeth RD918. Peeling-off of ink was evaluated by observing peeling off of ink when thermal transfer film was crumpled by hands and indicated by the following criteria. "O": No release; "Δ":Somewhat release occurres; "X":Considerably The results are shown in Table 2.

EXAMPLES 3-5 AND COMPARATIVE EXAMPLES 4-5

In the same manner as in Example 2, antistatic layer was coated on one side of the base film and heat resisting layer was coated on the other side of the base film. Thickness of the coated layers was as shown in Table 2.

The same meltable ink as used in Example 2 was coated on the antistatic layer at a coverage of 3 $g/m^2$.

The resulting thermal transfer films were evaluated in the same manner as in Example 1 and the results are shown in Table 2.

The results resistivity was measured at the ink layer side.

TABLE 2

| | Thickness of coat (μm) | | Evaluation | | | |
|---|---|---|---|---|---|---|
| | Anti-static layer | Heat resisting layer | Static charging (kV) | Surface resistivity (Ω) | Recording quality | Peeling-off of ink |
| Example 2 | 0.1 | 0.5 | 0.05 | $4.9 \times 10^9$ | 1.48 | ○ |
| Example 3 | 0.1 | 0.3 | 0.03 | $3.2 \times 10^9$ | 1.52 | ○ |
| Example 4 | 0.3 | 0.3 | 0.01 | $2.5 \times 10^9$ | 1.50 | ○ |
| Example 5 | 0.5 | 1.0 | 0.08 | $6.3 \times 10^9$ | 1.55 | Δ |
| Comparative Example 4 | 0 | 0.3 | 10 or more | $10^{14}$ or more | 1.30 | ○ |
| Comparative Example 5 | 0.6 | 0.3 | 0.07 | $5.4 \times 10^9$ | 1.51 | x |

As is clear from the results in Table 2, the thermal transfer films of Examples 2-5 were low in surface resistivity of the ink layer which contacts with image receiving sheet, namely, $2.5\times10^9$-$6.3\times10^9$ Ω and also low in static charging at thermal transfer recording, namely, 0.01-0.08 KV and thus static charging phenomenon was prevented. Furthermore, the thermal transfer films were superior in recording quality and anti-peeling-off of ink.

On the other hand, the thermal transfer film of Comparative Example 4 which had only the heat resisting layer, had a surface resistivity of $10^{14}$ Ω or higher and static charging of 10 KV or higher and thus operators were given uncomfortable feeling at handling of the film. Recording quality was 1.30 which was lower than the films of Examples 2-5.

The thermal transfer film of Comparative example 5 was low in surface resistivity, namely, $5.4\times10^9$ Ω and also low in static charging, namely, 0.07 KV, but since the antistatic layer was thick, peeling off of ink was observed considerably.

EXAMPLE 6

A coating liquid prepared by mixing the following antistatic agent and the following heat resisting material was coated on one side of a polyester film of 6 μm thick by a gravure coater to form a heat resisting layer containing antistatic agent and having a thickness of 0.5 μm.

Antistatic agent: 1 part by weight (dry solid content) 2% alcoholic silica sol of pH 4.2 containing isopropyl alcohol and 1-butanol as dispersion media.

Heat resisting material: 0.25 part by weight (dry solid content) 50% xylene solution of silicone resin/metal salt of organic acid=10/1

On the other side of the polyester film was coated an antistatic layer at a thickness of 0.2 μm in the same manner as in Example 1. On this layer was further coated a heat meltable ink having the following composition at a coverage of 3 $g/m^2$ by a hot melt coater to obtain a thermal transfer film of the present invention.

| (Composition of heat meltable ink) | |
|---|---|
| Carbon black | 15 parts by weight |
| Black dye | 5 parts by weight |
| Paraffin wax | 40 parts by weight |
| Carnauba wax | 30 parts by weight |
| Ethylene-vinyl acetate resin | 10 parts by weight |

Performance of the resulting thermal transfer film were evaluated in the same manner as in Example 1 and the results are shown in Table 3.

EXAMPLES 7 AND 8 AND COMPARATIVE EXAMPLES 6 AND 7

Heat resisting layer containing antistatic agent was coated in the same manner as in Example 6. Mixing ratio of the antistatic agent and the heat resisting material and thickness of the heat resisting layer were as shown in Table 3. Thickness of the antistatic layer coated on the other side of the polyester film was set at 0.2 μm and coverage of the heat meltable ink was set at 3 $g/m^2$. Results of evaluation made in the same manner as in Example 1 are also shown in Table 3.

TABLE 3

| | Mixing ratio (part by weight) | | Evaluation | | | | |
|---|---|---|---|---|---|---|---|
| | Antistatic agent | Heat resisting material | Thickness of heat resisting layer (μm) | Static charging (kV) | Surface resistivity (Ω) | Recording quality | Peeling-off of ink |
| Example 6 | 1 | 0.25 | 0.5 | 0.04 | $1.5 \times 10^9$ | 1.51 | ∘ |
| Example 7 | 1 | 5 | 0.5 | 0.13 | $7.0 \times 10^9$ | 1.50 | ∘ |
| Example 8 | 1 | 10 | 0.5 | 0.60 | $5.6 \times 10^9$ | 1.53 | ∘ |
| Comparative Example 6 | 1 | 0.2 | 0.5 | 0.03 | $3.5 \times 10^9$ | 1.52 | x |
| Comparative Example 7 | 1 | 11 | 0.5 | 2~3 | $5.5 \times 10^{12}$ | 1.51 | ∘ |

As is clear from the results of Table 3, the thermal transfer films of Examples 6–8 were low in surface resistivity of the surface which contacted with the image receiving sheet, namely, $1.5\times10^9$–$5.6\times10^{10}$ Ω and also low in static charging at thermal transfer recording, namely, 0.04–0.60 KV. Thus, static charging phenomenon was prevented. Furthermore, recoridng quality was superior and peeling-off of ink was not observed.

In Comparative Example 6, the amount of the heat resisting material was small, namely, 0.2 parts by weight based on 1 part by weight of the antistatic agent and thus blocking occurred on the opposite side of the heat resisting layer of polyester film to cause peeling off of ink.

In Comparative Example 7, since the amount of the heat resisting material was large relative to the antistatic agent, antistatic effect was not exhibited and surface resistivity was high, namely, $5.5\times10^{12}$ Ω and besides static charging was also high.

Recording quality of the thermal transfer films of these exmaples and comparative exmaples was high because the antistatic layer was coated on the side of the polyester film on which the meltable ink layer was present.

EXAMPLE 9

(1) Preparation of antistatic agent:

50 parts of dimethylaminoethyl methacrylate and 50 parts of methyl methacrylate were charged together with 150 parts of isopropyl alcohol in a four-necked flask and after replaced atmosphere therein with nitrogen, 0.6 part of azobisbutyronitrile was added as a catalyst, followed by heating to 80° C. and keeping at this temperature for 3 hours to perform copolymerization.

After cooling, thereto were added 12.6 parts of 12N hydrochloric acid and then a mixed solution composed of 60 parts of 3-chloro-2-hydroxypropyltrimethylammonium chloride and 50 parts of water, followed by heating to 80° C. again and keeping at that temperature for 4 hours to complete the reaction. The resulting copolymer had the following structure.

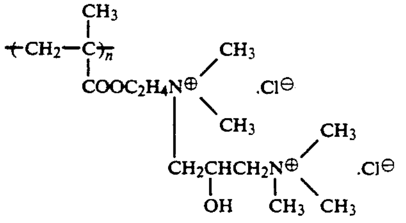

(2) Production of thermal transfer film:

The antistatic agent prepared by above method and then diluted to a concentration of 5% with isopropyl alcohol was coated on both sides of a polyester film of 6 μm thick by a gravure coater and dried to form an antistatic layer of 0.1 μm thick.

Successively, a coating liquid of a heat resisting material composed of 10 parts by weight of 50% xylene solution of silicone resin and 1 part by weight of a metal salt of an organic acid (curing agent) was coated on one of the antistatic layers by a gravure coater to form a heat resisting layer of 0.5 m thick.

A heat meltable ink having the following composition was coated on the other antistatic layer at a coverage of 3 g/m$^2$ by a hot melt coater to obtain a thermal transfer film of the present invention.

| (Composition of heat meltable ink) | |
|---|---|
| Carbon black | 15 parts by weight |
| Black dye | 5 parts by weight |
| Paraffin wax | 40 parts by weight |
| Carnauba wax | 30 parts by weight |
| Ethylene-vinyl acetate resin | 10 parts by weight |

Performances of the resulting thermal transfer film were evaluated in the same manner as in Example 1. Blocking resistance thereof was evaluated under the following conditions. The results are shown in Table 4.

Blocking resistance: A roll of film coated with the antistatic layer was left to stand for 24 hours at 55° C. and degree of blocking was evaluated according to the following criteria:

"O": No blocking occurred.
"Δ": Slight blocking occurred.
"X": Considerable blocking occurred.

EXAMPLES 10–12 AND COMPARATIVE EXAMPLES 8–9

In the same manner as in Example 9, antistatic layers were coated on both sides of a base film and a heat resisting layer was coated on one of the antistatic layers and a heat meltable ink layer was laminated on the other antistatic layer.

In Comparative Example 8, a heat resisting layer was coated on one side of a base film without coating antistatic layer and a heat meltable ink layer was coated on the other side without coating antistatic layer.

Results of evaluation are shown in Table 4. The value of surface resistivity is obtained by measuring at the heat meltable ink layer side.

TABLE 4

| | Thickness of coat (μm) | | Evaluation | | | |
|---|---|---|---|---|---|---|
| | Anti-static layer | Heat resisting layer | Static charging (kV) | Surface resistivity (Ω) | Peeling-off of ink | Blocking resistance |
| Example 9 | 0.1 | 0.5 | 0.03 | $6.6 \times 10^8$ | ∘ | ∘ |
| Example 10 | 0.2 | 0.4 | 0.00 | $3.3 \times 10^8$ | ∘ | ∘ |
| Example 11 | 0.3 | 0.3 | 0.00 | $1.8 \times 10^8$ | ∘ | ∘ |
| Example 12 | 0.5 | 0.5 | 0.00 | $9.4 \times 10^7$ | ∘ | ∘ |
| Comparative Example 8 | no | 0.5 | 10 or more | $10^{14}$ or more | ∘ | ∘ |
| Comparative Example 9 | 0.6 | 0.4 | 0.00 | $6.4 \times 10^7$ | x | Δ |

As is clear from the results of Table 4, the thermal transfer films of Examples 9–12 were low in surface resistivity of the ink layer which contacted with the image receiving sheet, namely, $9.4\times10^7$–$6.6\times10^8$ Ω and also low in static charging at thermal transfer recording, namely, 0.00–0.03 KV. Thus, static charging phenomenon was completely prevented. The value of charging 0.00 means unmeasurable area which is below the minimum limit of measuring equipment.

In Comparative Example 8, the thermal transfer film had only a heat resisting layer and this had a surface resistivity of $10^{14}$ Ω or higher and a static charging of 10 KV or higher and was found uncomfortable to operator.

In Comparative Example 9, the thermal transfer film had a resistivity of $6.4\times10^7$ Ω and static charging of 0.00 which was below the minimum of the measuring equipment. However, the antistatic layer was outside the present invention and peeling off of ink occurred and blocking resistance was a little.

EXAMPLE 13

The antistatic agent used in Example 9 was diluted to a concentration of 5% with isopropyl alcohol and then coated on one side of a polyester film of 6 μm thick by a gravure coater and drid to form an antistatic layer of 0.1 μm thick.

Successively, a coating liquid of a heat resisting material composed of 10 parts by weight of 50% xylene solution of silicone resin and 1 part by weight of a metal salt of an organic acid (curing agent) was coated on the other side of the polyester film by a gravure coater to form a heat resisting layer of 0.6 μm thick.

A heat meltable ink having the following composition was coated on the antistatic layer at a coverage of 3 g/$m^2$ by a hot melt coater to obtain a thermal transfer film of the present invention.

| (Composition of heat meltable ink) | |
|---|---|
| Carbon black | 15 parts by weight |
| Black dye | 5 parts by weight |
| Paraffin wax | 40 parts by weight |
| Carnauba wax | 30 parts by weight |
| Ethylene-vinyl acetate resin | 10 parts by weight |

Performances of the resulting thermal transfer film were evaluated in the same manner as in Example 9 and the results are shown in Table 5.

EXAMPLES 14–15 AND COMPARATIVE EXAMPLE 9

In the same manner as in Example 13, an antistatic layer and a heat meltable ink layer were laminated in succession on one side of a base film and a heat resisting layer was coated on the other side of the base film to obtain a thermal transfer film. Similarly, evaluation was carried out and the results are shown in Table 5.

TABLE 5

| | Thickness of coat (μm) | | Evaluation | | | |
|---|---|---|---|---|---|---|
| | Anti-static layer | Heat resisting layer | Static charging (kV) | Surface resistivity (Ω) | Peeling-off of ink | Blocking resistance |
| Example 13 | 0.1 | 0.6 | 0.04 | $9.3 \times 10^8$ | ∘ | ∘ |
| Example 14 | 0.3 | 0.6 | 0.00 | $3.5 \times 10^8$ | ∘ | ∘ |
| Example 15 | 0.5 | 0.6 | 0.00 | $2.1 \times 10^8$ | ∘ | ∘ |
| Comparative Example 10 | 1.0 | 0.6 | 0.00 | $7.5 \times 10^7$ | x | x |

As is clear from the results of Table 5, the thermal transfer films of Examples 13–15 were low in surface resistivity of the ink layer contacted with the image receiving sheet, namely, $2.1\times10^8$–$9.3\times10^8$ Ω and also low in static charging at thermal transfer recording, namely, 0.00–0.04 KV. Thus, static charging phenomenon was completely prevented. Besides, the thermal transfer films were superior in blocking resistance and no peeling off of ink occurred.

In Comparative Example 10, the antistatic layer was thick, namely, 1.0 μm which was outside the scope of the present invention. This transfer film was inferior in blocking resistance and peeling-off of ink occurred considerably.

EXAMPLE 16

The antistatic agent used in Example 9 was diluted to a concentratoin of 5% with isopropyl alcohol and then coated on one side of a polyester film of 6 μm thick by a gravure coater and dried to form an antistatic layer of 0.1 μm thick.

Successively, a heat resisting layer was laminated on the antistatic layer using the heat resisting material of Example 9.

The heat meltable ink used in Example 9 was coated on the other side of the polyester film at a coverage of 3 g/$m^2$ by a hot melt coater to obtain a thermal transfer film of the present invention. Evaluation was carried out in the similar way of Example 9 and the results are shown in Table 6.

EXAMPLES 17-18 AND COMPARATIVE EXAMPLE 11

In the same manner as in Example 16, an antistatic layer and a heat resisting layer were laminated in succession on one side of a base film and a heat meltable ink layer was coated on the other side of the base film to obtain a thermal transfer film. Similarly, evaluation was carried out and the results are shown in Table 6.

TABLE 6

| | Thickness of coat (μm) | | Evaluation | | | |
|---|---|---|---|---|---|---|
| | Anti-static layer | Heat resisting layer | Static charging (kV) | Surface resistivity (Ω) | Peeling-off of ink | Blocking resistance |
| Example 16 | 0.1 | 0.5 | 0.02 | $7.4 \times 10^8$ | ○ | ○ |
| Example 17 | 0.2 | 0.5 | 0.00 | $3.7 \times 10^8$ | ○ | ○ |
| Example 18 | 0.5 | 0.5 | 0.00 | $8.3 \times 10^7$ | ○ | ○ |
| Comparative Example 11 | 0.05 | 0.5 | 1~2 | $1.5 \times 10^{11}$ | ○ | ○ |

As is clear from the results of Table 6, the thermal transfer films of Examples 16-18 were low in surface resistivity of the ink layer which contacted with the image receiving sheet, namely, $8.3\times10^7$-$7.4\times10^8$ Ω and also low in static charging at thermal transfer recording, namely, 0.00-0.02 KV. Thus, static charging phenomenon was completely prevented. Besides, no peeling off of ink occurred and the thermal transfer films were superior in blocking resistance.

In Comparative Example 11, the antistatic layer was thin, namely, 0.05 μm which was outside the scope of the present invention. Static charging of this transfer film was 1-2 KV and the value of surface resistivity was high, namely, $1.5\times10^{11}$ Ω and thus static charging was not prevented.

EXAMPLE 19

A coating liquid of 2% alcoholic silica sol having a pH of 4.2 and containing isopropyl alcohol and 1-butanol as dispersing media was coated on one side of a polyester film of 6 μm thick by a gravure coater and dried to obtain an antistatic layer comprising an inorganic polymer of polysiloxane having silanol group and having a thickness of 0.1 μm.

Successively, a coating liquid of heat resisting material comprising 10 parts by weight of 50% xylene solution of silicone resin and 1 part by weight of a metal salt of organic acid (curing agent) was coated on the antistatic layer by a gravure coater to form a coat of heat resisting layer having a thickness of 0.5 μm.

A heat meltable ink having the same composition as in Example 1 was coated on another side of the polyester film by a hot melt coater at a coverage of 3 g/m² to obtain a thermal transfer film of the present invention.

Performances of the resulting thermal transfer film were evaluated by recording using a thermal printing apparatus manufactured by Matsushita Electronic Components Co., Ltd. Blocking resistance of the antistatic layer and the heat resisting layer was also evaluated according to the above-mentioned method. The results are shown in Table 7.

EXAMPLES 20-23 AND COMPARATIVE EXAMPLES 12-16

In the same manner as in Example 19, antistatic layer and heat resisting layer were coated. Thickness of the coated layers was as shown in Table 7. The coating amount of the heat meltable ink coated on another side of the polyester film was set at 3 g/m².

The resulting thermal transfer films were evaluated in the same manner as in Example 19 and the results are shown in Table 7.

TABLE 7

| | Thickness of coat (μm) | | Evaluation | | | | |
|---|---|---|---|---|---|---|---|
| | Antistatic layer | Heat resisting layer | Static charging (kV) | Surface resistivity (Ω) | Sticking resistance | Resistance to staining of thermal head | Blocking resistance |
| Example 19 | 0.1 | 0.5 | 0.1 (○) | $4.9 \times 10^9$ (○) | ○ | ○ | ○ |
| Example 20 | 0.1 | 1.0 | 0.6 (Δ) | $4.5 \times 10^{10}$ (Δ) | ○ | ○ | ○ |
| Example 21 | 0.3 | 1.0 | 0.15 (○) | $2.1 \times 10^{10}$ (○) | ○ | ○ | ○ |
| Example 22 | 0.5 | 0.5 | 0.06 (○) | $1.5 \times 10^9$ (○) | ○ | ○ | ○ |
| Comparative Example 12 | 0 | 0.5 | 10 or more (x) | $10^{14}$ or more (x) | ○ | ○ | ○ |
| Comparative Example 13 | 0.1 | 0.1 | 0.05 (○) | $1.2 \times 10^9$ (○) | x | x | x |
| Comparative Example 14 | 0.1 | 1.1 | 1~2 (x) | $7.4 \times 10^{11}$ (x) | ○ | ○ | ○ |
| Comparative Example 15 | 0.6 | 0.1 | 0.03 (○) | $1.1 \times 10^9$ (○) | Δ | Δ | x |
| Comparative Example 16 | 0.6 | 1.5 | 2~3 (x) | $6.3 \times 10^{13}$ (x) | ○ | ○ | ○ |

As is clear from the results in Table 7, the thermal transfer films of Examples 19-22 were low in surface resistivity of the surface which contacted with thermal head, namely, $1.5\times10^9$-$4.9\times10^9$ Ω and in static charging at thermal transfer recording, namely, 0.06-0.6 KV and thus static charging phenomenon was prevented. Furthermore, the thermal transfer films were superior in sticking resistance, resistance to staining of thermal head and blocking resistance.

On the other hand, the thermal transfer film of Comparative Example 12 which had only the heat resisting layer had a surface resistivity of higher than $10^{14}$ Ω and static charging of higher than 10 KV and thus operators were given uncomfortable feeling at handling of the film.

The thermal transfer film of Comparative Example 13 was low in surface resistivity, namely, $1.2\times10^9$ Ω and in static charging, namely, 0.05 KV, but since both the antistatic layer and the heat resisting layer were thin in thickness, it was inferior in sticking resistance, resistance to staining of thermal head and blocking resistance.

In Comparative Example 14, the heat resisting layer was thin, namely, 1.1 μm in thickness and so antistatic effect was not obtained and surface resistivity was $7.4\times10^{11}$ Ω and this was inferior.

In Comparative Example 15, the antistatic layer was thick, namely, 0.6 μm in thickness, resulting in a low surface resistivity of $1.1\times10^{9}$ Ω and static charging was also good, namely, 0.03 KV. However, the antistatic layer caused blocking to the back side of the base film.

In Example 16, the heat resisting layer was thick, namely, 1.5 μm in thickness and so antistatic effect was not obtained.

EXAMPLE 23

A coating liquid prepared by mixing the following antistatic agent and the following heat resisting material was coated on one side of a polyester film of 6 μm thick by a gravure coater to form a heat resisting layer containing antistatic agent of 0.5 μm in thickness.

Antistatic agent: 1 part by weight (dry solid content) 2% alcoholic silica sol of pH 4.2 containing isopropyl alcohol and 1-butanol as dispersing media Heat resisting material: 0.25 part by weight (dry solid content) 50% xylene solution of silicone resin/metal salt of organic acid=10/1

On another side of the polyester film was coated a heat meltable ink having the following composition at a coverage of 3 g/m² by a hot melt coater to obtain a thermal transfer film of the present invention.

| (Composition of heat meltable ink) | |
|---|---|
| Carbon black | 15 parts by weight |
| Black dye | 5 parts by weight |
| Paraffin wax | 40 parts by weight |
| Carnauba wax | 30 parts by weight |
| Ethylene-vinyl acetate resin | 10 parts by weight |

Performances of the resulting thermal transfer film were evaluated in the same manner as in Example 19. Furthermore, blocking resistance of the heat resisting layer containing antistatic agent was also evaluated according to the method mentioned herebefore. The results are shown in Table 8.

EXAMPLES 24-26 AND COMPARATIVE EXAMPLES 17-20

Heat resisting layer containing antistatic agent was coated in the same manner as in Example 23. Mixing ratio of the antistatic agent and the heat resisting material and thickness of the heat resisting layer were as shown in Table 8. Coverage of the heat meltable ink coated on another side of the polyester film was set at 3 g/m². Results of evaluation made in the same manner as in Example 19 are also shown in Table 8.

TABLE 8

| | Mixing ratio (part by weight) | | Thickness of heat resisting layer (μm) | Evaluation | | | | |
|---|---|---|---|---|---|---|---|---|
| | Antistatic agent | Heat resisting material | | Static charging (kV) | Surface resistivity (Ω) | Sticking resistance | Resistance to staining of thermal head | Blocking resistance |
| Example 23 | 1 | 0.25 | 0.5 | 0.04 (○) | $1.6\times10^{9}$ (○) | ○ | Δ | Δ |
| Example 24 | 1 | 0.5 | 0.4 | 0.05 (○) | $2.0\times10^{9}$ (○) | ○ | ○ | ○ |
| Example 25 | 1 | 5 | 0.3 | 0.14 (○) | $3.3\times10^{9}$ (○) | ○ | ○ | ○ |
| Example 26 | 1 | 10 | 1.5 | 0.65 (Δ) | $8.5\times10^{10}$ (Δ) | ○ | ○ | ○ |
| Comparative Example 17 | 1 | 0.2 | 0.5 | 0.03 (○) | $1.3\times10^{9}$ (○) | ○ | Δ | x |
| Comparative Example 18 | 1 | 11 | 1.0 | 2~3 (x) | $9.6\times10^{12}$ (x) | ○ | ○ | ○ |
| Comparative Example 19 | 1 | 12 | 1.6 | 3~4 (x) | $5.7\times10^{13}$ (x) | ○ | ○ | ○ |
| Comparative Example 20 | 1 | 5 | 0.2 | 1~2 (x) | $4.3\times10^{11}$ (x) | x | ○ | ○ |

As is clear from the results of Table 8, the thermal transfer films of Examples 23-26 were low in surface resistivity of the surface which contacted with the thermal head, namely, $1.6\times10^{9}$–$8.5\times10^{10}$ Ω and in static charging at thermal transfer recording, namely, 0.04–0.65 KV. Thus, static charging phenomenon was prevented. Furthermore, they were superior in sticking resistance, resistance to staining of the thermal head and blocking resistance. In Example 23, resistance to staining of thermal head and blocking resistance were graded to be "Δ". This is because mixing ratio of the heat resisting material was that of lower limit and the antistatic agent gave this results. However, these results were practically acceptable.

In Comparative Example 17, amount of the heat resisting material was small, namely, 0.2 part by weight based on 1 part by weight of the antistatic agent and so blocking occurred on the side of the polyester film opposite the heat resisting layer.

In Comparative Examples 18-20, since amount of the heat resisting material was large relative to the antistatic agent, antistatic effect was not exhibited and surface resistivity was high, namely, $4.3\times10^{11}$–$5.7\times10^{13}$ Ω and besides static charging was also high.

In Comparative Example 20, the heat resisting layer was thin, namely, 0.2 μm in thickness and sticking resistance was also inferior.

As shown above, in case of using the antistatic layer comprising an inorganic polymer of polysiloxane having solanol group of the present invention, was in air is adsorbed and the surface resistivity is reduced to the order of $10^{10}$ Ω or lower. Since the surface resistivity of the surface which contacts with thermal head is low, namely, the order of $10^{10}$ Ω or lower, substantially no static electricity occurs at thermal transfer recording.

Furthermore, in case of using a quaternary ammonium type polyelectrolyte, the antistatic layer has antiblocking effect in addition to the above-mentioned antistatic effect and hence heat meltable ink is not peeled off.

What is claimed is:

1. A thermal transfer film which comprises a base film, a heat resisting layer provided on one side of the base film, a heat meltable ink layer provided on the other side of the base film, and an antistatic layer provided between the base film and either the heat resisting layer or the heat meltable ink layer, said antistatic layer comprising a film of an antistatic agent which is an inorganic polymer of a polysiloxane containing a silanol group or an acrylic cationic polymer.

2. A thermal transfer film according to claim 1, wherein the antistatic layer comprises an inorganic polymer of polysiloxane containing silanol group and has a surface resistivity of $9.9\times10^{10}\ \Omega$ or less.

3. A thermal transfer film according to claim 1 wherein the antistatic layer has a surface resistivity of $9.9\times10^{10}\ \Omega$ or less.

4. A thermal transfer film according to claim 1 wherein the antistatic layer has a thickness of 0.1–0.5 $\mu$m.

5. A thermal transfer film according to claim 1 wherein the acrylic cationic polymer has a monomer unit containing two acrylic cationic ions and one hydroxyl group.

6. A thermal transfer film according to claim 1, wherein the inorganic polymer of polysiloxane having silanol group is an alcoholic silica sol having a pH of 2–5.

7. A thermal transfer film which comprises a base film, a heat resisting layer provided on one side of the base film, a heat meltable ink layer provided on the other side of the base film, an antistatic layer provided between the base film and the heat resisting layer, and another antistatic layer provided between the base film and the heat meltable ink layer, said antistatic layer comprising a film of an antistatic agent which is an inorganic polymer of a polysiloxane containing a silanol group or an acrylic cationic polymer.

8. A thermal transfer film which comprises a base film, a heat resisting layer containing an antistatic agent on one side of the base film, and a heat meltable ink layer provided on the other side of the base film, the heat resisting layer being made of a film of a mixture of a heat resisting material and the antistatic agent which is an inorganic polymer of a polysiloxane containing a silanol group or an acrylic cationic polymer.

9. A thermal transfer film according to claim 8, wherein thickness of the heat resisting layer containing antistatic agent is 0.3–1.5 $\mu$m.

10. A thermal transfer film according to claim 8, wherein the heat resisting layer containing antistatic agent contains 0.25–10.0 parts by weight of a heat resisting material per 1 part by weight of the antistatic agent.

11. A thermal transfer film which comprises a base film, an anti-static layer provided on one side of the base film, and a heat meltable recording layer provided on the other side of the base film, said anti-static layer comprising a film of an anti-static agent which is an inorganic polymer of a polysiloxane containing a silanol group or an acrylic cationic polymer.

* * * * *